(12) United States Patent
Park et al.

(10) Patent No.: US 9,541,784 B2
(45) Date of Patent: Jan. 10, 2017

(54) LIQUID CRYSTAL DISPLAY AND METHOD FOR FABRICATING THE SAME

(71) Applicant: Samsung Display Co., Ltd., Yongin, Gyeonggi-Do (KR)

(72) Inventors: Joon Yong Park, Gunpo-si (KR); Dong Min Lee, Anyang-si (KR); Sang Wook Lee, Busan (KR); Chang Oh Jeong, Suwon-si (KR); Gyung Min Baek, Yongin-si (KR); Kyung Tae Chae, Hwaseong-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 53 days.

(21) Appl. No.: 14/099,968

(22) Filed: Dec. 8, 2013

(65) Prior Publication Data

US 2015/0042936 A1  Feb. 12, 2015

(30) Foreign Application Priority Data

Aug. 9, 2013  (KR) .................. 10-2013-0094943

(51) Int. Cl.
*G02F 1/1339* (2006.01)
*G02F 1/1333* (2006.01)
*G02F 1/1343* (2006.01)

(52) U.S. Cl.
CPC ..... *G02F 1/133345* (2013.01); *G02F 1/13439* (2013.01)

(58) Field of Classification Search
CPC G02F 1/1343; G02F 1/1339; G02F 1/133345; G02F 1/13439

USPC .................................................. 349/155–157
See application file for complete search history.

(56) References Cited

U.S. PATENT DOCUMENTS

| 5,999,236 A * | 12/1999 | Nakajima ............. C23C 14/185 257/59 |
| 6,690,445 B2 * | 2/2004 | Matsumoto ......... G02F 1/13394 349/155 |
| 7,674,404 B2 | 3/2010 | Osada |
| 2007/0040976 A1 * | 2/2007 | Lee ................... G02F 1/133707 349/134 |
| 2012/0062448 A1 * | 3/2012 | Kim .................. G02F 1/133377 345/55 |
| 2012/0112138 A1 | 5/2012 | Matsubara et al. |
| 2013/0128174 A1 * | 5/2013 | Kimura ............. G02F 1/134363 349/43 |

FOREIGN PATENT DOCUMENTS

| JP | 4316647 B2 | 8/2009 |
| JP | 2011-237571 A | 11/2011 |
| JP | 4852526 B2 | 1/2012 |
| KR | 1020040085789 A | 10/2004 |
| KR | 1020050001952 A | 1/2005 |

(Continued)

*Primary Examiner* — Charles Chang
(74) *Attorney, Agent, or Firm* — Cantor Colburn LLP

(57) ABSTRACT

A liquid crystal display includes a substrate; a first electrode on the substrate; a second electrode on the first electrode and separated from the first electrode; a cavity defined between the first electrode and the second electrode; a first protection layer on the second electrode; a cover layer on the first protection layer; and a liquid crystal layer including liquid crystal molecules in the cavity. The second electrode includes metal oxide and zinc oxide.

21 Claims, 12 Drawing Sheets

(56) References Cited

FOREIGN PATENT DOCUMENTS

| KR | 1020110068215 A | 6/2011 |
|----|----|----|
| KR | 1020110070377 A | 6/2011 |
| KR | 1020110073202 A | 6/2011 |
| KR | 1020110133900 A | 12/2011 |
| KR | 1020120039027 A | 4/2012 |
| KR | 1020120062341 A | 6/2012 |
| KR | 1020120072237 A | 7/2012 |

* cited by examiner

LIQUID CRYSTAL DISPLAY AND METHOD FOR FABRICATING THE SAME

This application claims priority to Korean Patent Application No. 10-2013-0094943, filed on Aug. 9, 2013, and all the benefits accruing therefrom under 35 U.S.C. §119, the disclosure of which is incorporated herein in its entirety by reference.

BACKGROUND

1. Field

The invention relates to a liquid crystal display and a method for fabricating the same.

2. Description of the Related Art

A liquid crystal display is one of a number of display devices that have been widely used. The liquid crystal display is a display device that can adjust the quantity of light penetrating therethrough by applying a voltage to two opposite electrodes (e.g., a pixel electrode and a common electrode), and controlling an arrangement of liquid crystal molecules of a liquid crystal layer interposed between the two electrodes.

Typically, a space is maintained between two substrates of a liquid crystal display so that a liquid crystal layer is provided between the two substrates. For this, spacers are disposed between the two substrates. However, since spacers are adhered to one of the two substrates such as with an adhesive, the liquid crystal display fabricating process is complicated and the manufacturing cost is increased. Therefore, there remains a need for an improved liquid crystal display in which a space between two substrates thereof is maintained, and a manufacturing process and costs are reduced.

SUMMARY

In order to simplify a liquid crystal display fabricating process and to reduce the manufacturing cost thereof, a liquid crystal display has been developed, in which a cavity is defined therein for providing a space where a liquid crystal layer is disposed on one substrate, instead of spacers being used between two substrates to maintain a space the two substrates.

The cavity may be formed by removing a sacrificial layer after the sacrificial layer, a common electrode, a protection layer and a cover layer of the liquid crystal display are formed on one substrate. The cavity has an inlet portion to provide a path through which liquid crystals are injected into the cavity. The inlet portion of the cavity is open when the liquid crystals are injected into the cavity, and is sealed after the injection of the liquid crystals is completed.

However, in a liquid crystal display having the cavity, after a common electrode and a protection layer are formed, stresses of the common electrode and the protection layer are greatly changed through a subsequent thermal manufacturing process, and the stresses cause wrinkles to be generated in the common electrode. Such wrinkles may change the shape of the inlet portion of the cavity such that forming the liquid crystal layer with a desired size may be difficult.

Further, the common electrode typically includes indium tin oxide ("ITO"), and thus the common electrode may be partially crystallized through the subsequent thermal manufacturing process. Accordingly, in a data pad exposing manufacturing process provided in the liquid crystal display fabricating process to connect to external wirings, a part of the common electrode that is located around the data pad may not be sufficiently etched, and an electrical short may occur between the part of the common electrode that is not etched and the data pad.

Accordingly, one or more exemplary embodiment of the invention provides a liquid crystal display, which can reduce or effectively prevent the occurrence of an electrical short between a common electrode and a data pad through smooth etching of the common electrode, and can form a liquid crystal layer having a desired size through reduction or prevention of deformation of an inlet portion of a cavity.

One or more exemplary embodiment of the invention provides a method for fabricating a liquid crystal display, which can reduce or effectively prevent the occurrence of an electrical short between a common electrode and a data pad through smooth etching of the common electrode, and can form a liquid crystal layer having a desired size through reduction of deformation of an inlet portion of a cavity.

Additional advantages, subjects and features of the invention will be set forth in part in the description which follows and in part will become apparent to those having ordinary skill in the art upon examination of the following or may be learned from practice of the invention.

In one exemplary embodiment of the invention, there is provided a liquid crystal display including: a substrate; a first electrode on the substrate; a second electrode on the first electrode and insulated from the first electrode; a cavity defined between the first electrode and the second electrode; a first protection layer on the second electrode; a cover layer on the first protection layer; and a liquid crystal layer including liquid crystal molecules in the cavity. The second electrode includes metal oxide and zinc oxide.

The metal oxide may be about 10 weight percent (wt %) to about 90 wt % with respect to a total content of the metal oxide and zinc oxide.

The metal oxide may include at least one selected from $In_2O_3$, $Ga_2O_3$, $Cr_2O_3$, MnO, $Ta_2O_5$, $SiO_2$, $TiO_2$, $ZrO_2$, BaO, $Li_2O$, $La_2O_3$, $Nd_2O_3$, BeO, $ThO_2$, $Y_2O_3$, CaO, $Sc_2O_3$, MgO, $Sm_2O_3$, $Al_2O_3$, $UO_2$, CaO, $B_2O_3$, $Na_2O$ and $Nb_2O_5$.

The second electrode may have a stress of about −100 megapascals (MPa) to about +100 MPa.

The second electrode may have a thickness of about 500 angstroms (Å) or more.

The first protection layer may include at least one of SiNx, SiOx and SiOxNy.

The first protection layer may have a stress of about −100 MPa to about +100 MPa.

The first protection layer may be a tensile stress film having a stress of about +1 megapascal (MPa) to about +100 MPa.

The liquid crystal display may further include a second protection layer on the cover layer.

A difference between an initial stress and a final stress of the second electrode and the first protection layer may be about 1 MPa to about 10 MPa. The initial stress may be defined as a stress of the second electrode and the first protection layer, without the cover layer and the second protection layer on the second electrode and the first protection layer. The final stress may be defined as a stress of the second electrode and the first protection layer, with the cover layer and the second protection layer on the second electrode and the first protection layer.

The first protection layer may have a thickness of about 1000 Å or more.

In another exemplary embodiment of the invention, there is provided a method for fabricating a liquid crystal display, including: forming a first electrode on a substrate; forming a sacrificial layer on the first electrode; forming a second electrode and a first protection layer, on the sacrificial layer; forming a cover layer on the first protection layer; forming a cavity between the first electrode and the second electrode, by removing the sacrificial layer; and forming a liquid crystal layer, by injecting of liquid crystal molecules into the cavity. The second electrode is formed of metal oxide and zinc oxide.

The first protection layer may be formed of at least one of SiNx, SiOx and SiOxNy.

The second electrode may be formed to have a stress of about −100 MPa to about +100 MPa.

The first protection layer may be formed to have a stress of about −100 MPa to about +100 MPa.

The first protection layer may be formed to be a tensile stress film having a stress of about +1 MPa to about +100 MPa.

The method for fabricating a liquid crystal display may further include forming a second protection layer on the cover layer.

A difference between an initial stress and a final stress of the second electrode and the first protection layer may be about 1 MPa to about 10 MPa The initial stress may be a stress after the first protection layer is formed, and the final stress may be a stress after the cover layer is formed and the second protection layer is formed.

The method for fabricating a liquid crystal display may further include forming an alignment film along an inner wall of the cavity and covering the first electrode, before the forming the liquid crystal layer.

The forming the liquid crystal layer may include injecting the liquid crystal molecules into the cavity through an inlet portion of the cavity. The method for fabricating a liquid crystal display may further include forming a sealing film at the inlet portion of the cavity to seal the inlet portion of the cavity, after the injecting the liquid crystal molecules is completed.

According to one or more exemplary embodiment of the invention, at least the following effects can be achieved.

According to one or more exemplary embodiment of the liquid crystal display according to the invention, since the common electrode is formed of a material including metal oxide and zinc oxide (ZnO), a change of a physical property of the common electrode from a subsequent thermal process can be reduced or effectively prevented, and thus complete and accurate etching of the common electrode in a data pad exposing process provided in the liquid crystal display fabricating process, becomes possible. Accordingly, occurrence of an electrical short, which occurs between a part of the common electrode that is not etched well and the data pad, can be reduced or effectively prevented.

Further, according to one or more exemplary embodiment of the liquid crystal display and the method for fabricating the same according to the invention, since the common electrode is formed to have a stress of about −100 MPa to about +100 MPa and the first protection layer is formed to have a stress of about −100 MPa to about +100 MPa, the difference between the initial stresses of the common electrode and the first protection layer, and the final stresses thereof after the subsequent thermal process can be minimized. Accordingly, generation of wrinkles, which may be generated in the common electrode due to the subsequent thermal process, can be minimized to reduce or effectively prevent the deformation of the inlet portion of the cavity, and thus the liquid crystal layer with a desired size can be formed.

The effects according to the invention are not limited to the contents as exemplified above, but further various effects are included in the description.

BRIEF DESCRIPTION OF THE DRAWINGS

The above and other objects, features and advantages of the invention will be more apparent from the following detailed description taken in conjunction with the accompanying drawings, in which.

DETAILED DESCRIPTION

Figure 1:
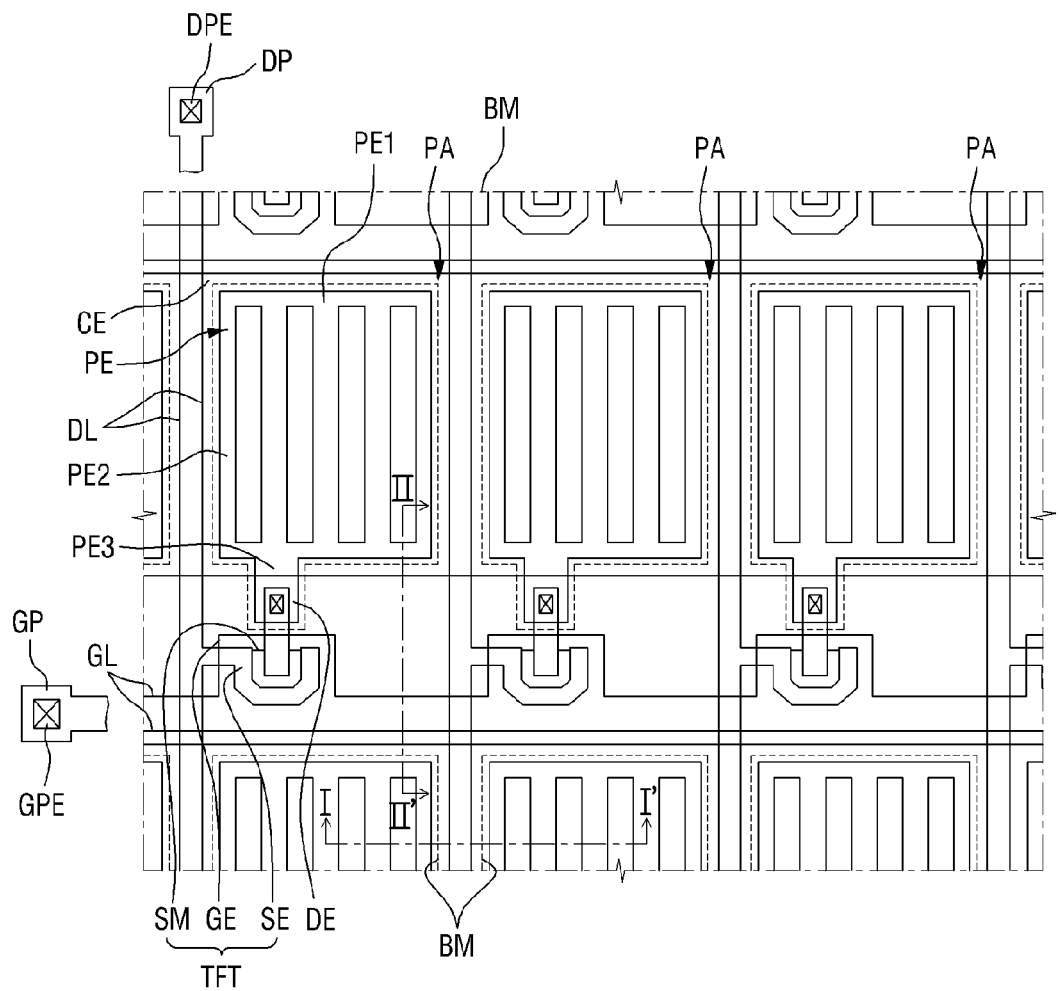
FIG. 1 is a plan view of an exemplary embodiment of a liquid crystal display according to the invention.

Advantages and features of the invention and methods of accomplishing the same may be understood more readily by reference to the following detailed description of exemplary embodiments and the accompanying drawings. The invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the invention will only be defined by the appended claims. In the drawings, the size and relative sizes of layers and regions may be exaggerated for clarity.

It will also be understood that when a layer is referred to as being "on" another layer or substrate, it can be directly on the other layer or substrate, or intervening layers may also be present. The same reference numbers indicate the same components throughout the specification.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "lower," "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments of the invention will be described with reference to the accompanying drawings.

Figure 2:
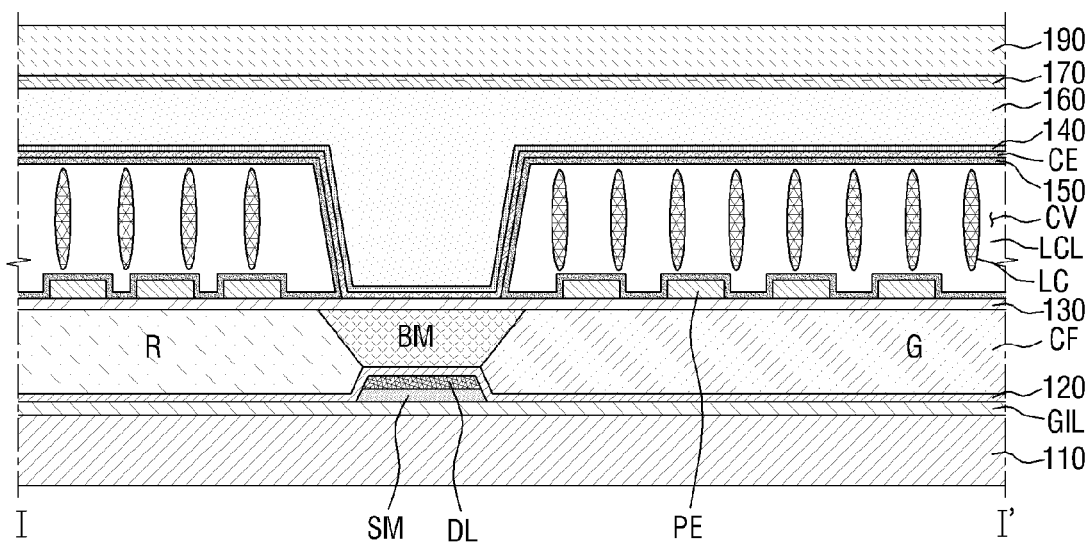
FIG. 2 is a cross-sectional view taken along line I-I' of FIG. 1.

FIG. 1 is a plan view of an exemplary embodiment of a liquid crystal display according to the invention. FIG. 2 is a cross-sectional view taken along line I-I' of FIG. 1, and FIG. 3 is a cross-sectional view taken along line II-II' of FIG. 1.

Figure 3:
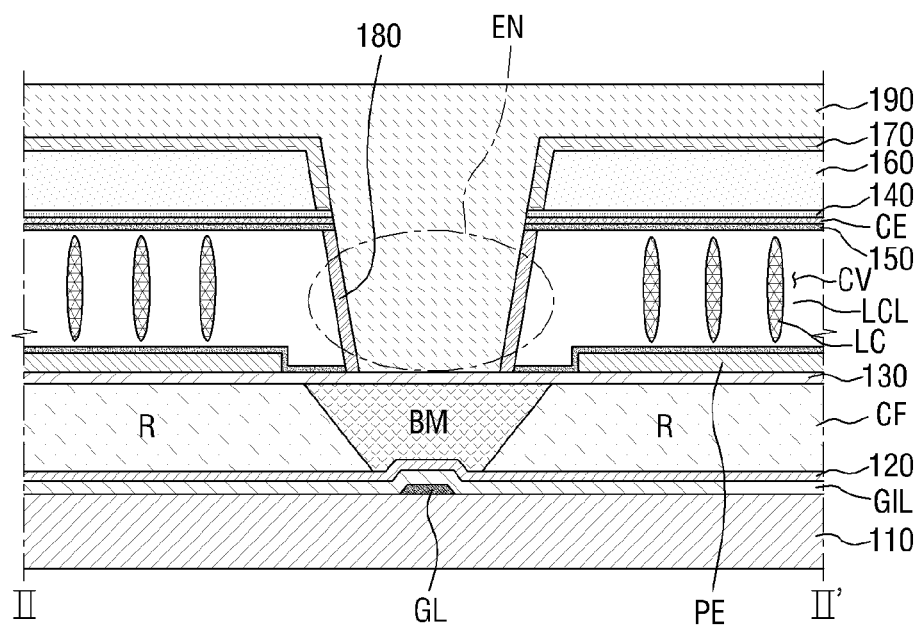
FIG. 3 is a cross-sectional view taken along line II-II' of FIG. 1.

Referring to FIGS. 1 to 3, a liquid crystal display may include a substrate 110, a gate line GL, a data line DL, a gate insulating layer GIL, a thin film transistor TFT, an insulating layer 120, a color filter CF, a black matrix BM, a first capping layer 130, a pixel electrode (also referred to as a "first electrode") PE, a common electrode (also referred to as a "second electrode") CE, a first protection layer 140, an alignment film 150, a cover layer 160, a second protection layer 170, a sealing film 180, and a second capping layer 190.

The substrate 110 may be a transparent insulating substrate, and may have a plurality of pixel areas PA defined thereon. In one exemplary embodiment, a pixel area may be defined by the gate line GL and the data line DL, but the invention is not limited thereto.

The gate line GL is disposed on the substrate 110, is elongated to extend in a first direction and transfers a gate signal. A gate pad GP is connected to one end of the gate line GL. A gate pad electrode GPE may be disposed on the gate pad GP. The gate pad electrode GPE is a contact electrode that connects an external wiring for applying a signal to the pixel electrode PE via the gate line GL. The gate pad GP may be a portion of the gate line GL which is wider than a remainder of the gate line GL and in a same layer as the gate line GL. The gate pad electrode GPE may be in a different layer of the liquid crystal display than that of the gate line GL and the gate pad GP.

The data line DL is disposed on the substrate 110, is elongated to extend in a second direction that crosses the first direction, is insulated from the gate line GL and transfers a data signal. A data pad DP is connected to one end of the data line DL. A data pad electrode DPE may be disposed on the data pad DP. The data pad electrode DPE is another contact electrode that connects an external wiring for applying a signal to the pixel electrode PE. The data pad DP may be a portion of the data line DL which is wider than a remainder of the data line DL and in a same layer as the data line DL. The data pad electrode DPE may be in a different layer of the liquid crystal display than that of the data line DL and the data pad DP.

The gate insulating layer GIL covers the gate pad GP and the gate line GL disposed on an upper surface of the substrate 110. The gate insulating layer GIL includes an insulating material. In one exemplary embodiment, for example, the gate insulating layer GIL may include silicon nitride or silicon oxide. In contrast, the data line DL and the data pad DP may be disposed on (e.g., above) the gate insulting layer GIL.

The thin film transistor TFT includes a gate electrode GE, a semiconductor layer SM, a source electrode SE, and a drain electrode DE.

The gate electrode GE may project from the gate line GL toward the semiconductor layer SM, in a plan view. The gate electrode GE may be in a same layer as the gate line GL and the gate pad GP. The gate electrode GE may include any one of indium tin oxide ("ITO"), indium zinc oxide ("IZO"), and indium tin zinc oxide ("ITZO"). Further, the gate electrode GE may have a two-layer structure including a first electrode layer including any one of the above-described materials, and a second electrode layer including a material to be described later. The second electrode layer may include a metal, such as copper (Cu), molybdenum (Mo), aluminum (Al), tungsten (W), chrome (Cr) or titanium (Ti), or an alloy including at least one of the above-described metals.

The semiconductor layer SM is disposed overlapping the gate electrode GE and on the gate insulating layer GIL. The semiconductor layer SM may include an active layer provided on the gate insulating layer GIL, and an ohmic contact layer provided on the active layer. The semiconductor layer SM may be disposed between the data line DL and the gate insulating layer GIL. Further, the semiconductor layer SM may also be disposed between the data pad DP and the gate insulating layer GIL.

The source electrode SE may project from the data line DL, and overlaps at least a part of the gate electrode GE, in a plan view. The source electrode SE may be in a same layer as the data line DL and the data pad DP. The drain electrode DE is spaced apart from the source electrode SE, and overlaps at least a part of the gate electrode GE, in a plan view. The drain electrode EE may be in a same layer as the data line DL and the data pad DP. The source electrode SE and the drain electrode DE may include a metal, such as copper, molybdenum, aluminum, tungsten, chrome or titanium, or an alloy including at least one of the above-described metals. The source electrode SE and the drain electrode DE overlap a part of the semiconductor layer SM in an area other than an area where the source electrode SE and the drain electrode DE are spaced apart from each other. The semiconductor layer SM is exposed by the spaced apart source electrode SE and drain electrode DE.

The insulating layer 120 is disposed on the gate insulating layer GIL. Through-holes may be defined in the insulating layer 120 for exposing the drain electrode DE, the gate pad GP and/or the data pad DP. The insulating layer 120 may include, for example, silicon nitride or silicon oxide.

The color filter CF is disposed on the insulating layer 120 corresponding to respective pixel areas PA. The color filter CF is to provide a color to light that penetrates a liquid crystal layer LCL, and may display one of a red (R) color light, a green (G) color light and a blue (B) color light. However, the color filter CF is not limited to the above-described color filters. A plurality of color filters CF may be collectively referred to as a color filter layer.

The black matrix BM may be disposed on the insulating layer 120 at the edge of each pixel area PA. That is, the black matrix BM may surround the color filter CF, in the plan view. The black matrix BM may overlap the data line DL and the thin film transistor TFT. The black matrix BM includes a light blocking or light interception material, and intercepts unnecessary light in implementing an image displayed by the liquid crystal display. In one exemplary embodiment, for example, the black matrix BM may reduce or effectively prevent light leakage, which may occur at the edge of the liquid crystal layer LCL due to an abnormal behavior of the liquid crystal layer LCL, or may reduce or effectively prevent color mixture, which may appear at the edge of the color filter CF.

The first capping layer 130 is disposed on the color filter CF and the black matrix BM, and may serve to planarize and protect the color filter CF and the black matrix BM. The first capping layer 130 may include an insulating material.

The pixel electrode PE is disposed on the first capping layer 130 corresponding to the respective pixel areas PA, and is connected to the drain electrode DE through a contact hole defined in one or more layers underlying the pixel electrode PE.

The pixel electrode PE includes at least one trunk portion PE1, a plurality of branch portions PE2 projecting from the trunk portion PE1, and a connection portion PE3 extended from the trunk portion PE1 and which connects the trunk portion PE1 and the drain electrode DE to each other. The branch portions PE2 are spaced apart at a predetermined distance from each other. The branch portions PE2 may be elongated to extend in parallel in a predetermined direction. The trunk portion PE1 and the branch portions PE2 are not limited to the arrangement as illustrated in FIG. 1, but may have various arrangements. The pixel electrode PE may include a transparent conductive material, for example, ITO.

The common electrode CE is disposed on the first capping film 130, and is spaced apart from the pixel electrode PE to be isolated (e.g., spaced apart and/or insulated) from the pixel electrode PE. Accordingly, a cavity CV is defined between the common electrode CE and the pixel electrode PE. Liquid crystal molecules LC are disposed in the cavity CV to form the liquid crystal layer LCL. In an exemplary embodiment of fabricating the liquid crystal display, injection of the liquid crystal molecules LC may be performed through an open inlet portion EN of the cavity CV which is extended along the first direction of the substrate 110 and is positioned overlapping the gate line GL.

The common electrode CE includes a material that includes metal oxide and zinc oxide (ZnO). Zinc oxide does not cause a change in a physical property of the common electrode CE in a subsequent thermal manufacturing process. In one exemplary embodiment, for example, the zinc oxide does not cause a change in a physical property of the common electrode CE in a subsequent baking process included in a process for forming the cover layer 160 and/or a subsequent baking process included in a process for forming the second protection layer 170. Since the zinc oxide does not cause a change in a physical property of the common electrode CE, the common electrode CE is not partially crystallized by the subsequent thermal process, and thus the etching of the portion of the common electrode CE that is positioned around the data pad can be performed accurately and completely in the data pad exposing process of a liquid crystal display fabricating process. Accordingly, in one or more exemplary embodiment of the invention, occurrence of an electrical short between the data pad and the common electrode can be reduced or effectively prevented. In contrast, in a conventional liquid crystal display, a common electrode which is formed of ITO is not etched well, but instead is partially crystallized due to the change of the physical property thereof in a thermal process.

The metal oxide may include at least one selected from $In_2O_3$, $Ga_2O_3$, $Cr_2O_3$, $MnO$, $Ta_2O_5$, $SiO_2$, $TiO_2$, $ZrO_2$, $BaO$, $Li_2O$, $La_2O_3$, $Nd_2O_3$, $BeO$, $ThO_2$, $Y_2O_3$, $CaO$, $Sc_2O_3$, $MgO$, $Sm_2O_3$, $Al_2O_3$, $UO_2$, $CaO$, $B_2O_3$, $Na_2O$, and $Nb_2O_5$. The metal oxide may be about 10 weight percent (wt %) to about 90 wt % with respect to a total content of the metal oxide and zinc oxide.

Further, the common electrode CE may have a stress property of about −100 megapascals (MPa) to about +100 MPa. When the common electrode CE is in the above-described stress range, the difference between the initial stresses of the common electrode CE and the first protection layer 140, and the final stresses of the common electrode CE and the first protection layer 140 after the subsequent thermal process, is about 1 MPa to about 10 MPa. In an exemplary embodiment of fabricating a liquid crystal display, the initial stress may be a stress after the first protection layer 140 is formed, and the final stress may be a stress after the cover layer 160 is formed and the second protection layer 170 is formed. In other words, the initial stress may be defined as a stress of the second electrode CE and the first protection layer 140, without the cover layer 160 and the second protection layer 170 on the second electrode CE and the first protection layer 140, and the final stress may be defined as a stress of the second electrode CE and the first protection layer 140, with the cover layer 160 and the second protection layer 170 on the second electrode CE and the first protection layer 140.

If the difference between the initial stress and the final stress of the common electrode CE and the first protection layer 140 is relatively small, the occurrence of wrinkles on the common electrode CE is minimized, and as a result, the deformation of the inlet portion EN of the cavity CV can be reduced or effectively prevented. Here, the stress of the common electrode CE in the range of about −100 MPa to about +100 MPa may be defined through adjustment of process conditions, for example, power, pressure and temperature in forming the common electrode CE.

Further, the common electrode CE may have a cross-sectional thickness of about 500 angstroms (Å) or more. The cross-sectional thickness of the common electrode CE may differ depending on the resistance value of the common electrode CE that is required when the liquid crystal display is driven. That is, as the resistance value of the common electrode CE that is required when the liquid crystal display is decreased, the cross-sectional thickness of the common electrode CE may be increased.

The first protection layer 140 is disposed on a front (e.g., upper) surface of the common electrode CE to protect the common electrode CE. The first protection layer 140 may include at least one of SiNx, SiOx and SiOxNy.

Further, the first protection layer 140 may have a cross-sectional thickness of about 1000 Å or more. The cross-sectional thickness of the first protection layer 140 provides a sufficient protection function for the common electrode CE Further, the first protection layer 140 may have a stress of about −100 MPa to about +100 MPa. When the first protection layer 140 is in the above-described stress range, the difference between the initial stresses of the common electrode CE and the first protection layer 140, and the final stresses of the common electrode CE and the first protection layer 140 after the subsequent thermal process, is about 1 MPa to about 10 MPa. Again, the initial stress may be defined as a stress of the second electrode CE and the first protection layer 140, without the cover layer 160 and the second protection layer 170 on the second electrode CE and the first protection layer 140, and the final stress may be defined as a stress of the second electrode CE and the first protection layer 140, with the cover layer 160 and the second protection layer 170 on the second electrode CE and the first protection layer 140.

If the difference between the initial stress and the final stress of the common electrode CE and the first protection layer 140 is relatively small, the occurrence of wrinkles on the common electrode CE is minimized, and as a result, the deformation of the inlet portion EN of the cavity CV can be reduced or effectively prevented. Here, the stress of the first protection layer 140 in the range of about −100 MPa to about +100 MPa may be defined through adjustment of process conditions, for example, power, pressure and temperature, in forming the first protection layer 140.

Table 1 below shows experimental data indicating that the difference between the initial stress and the final stress of the common electrode CE and the first protection layer 140 is small when the stress of the common electrode CE is about −100 MPa to about +100 MPa and the stress of the first protection layer 140 is about −100 MPa to about +100 MPa. In Table 1, the first heat treatment is the same as the heat treatment when the cover layer 160 is formed, and the second heat treatment is the same as the heat treatment when the second protection layer 170 is formed. The cross-sectional thickness of the common electrode and the first protection layer is 1000 Å.

TABLE 1

| No. | Stress (MPa) of Common Electrode (1100 Å) | Stress (MPa) of First Protection Layer (1000 Å) | Initial Stress (MPa) of Common electrode/First Protection Layer | Initial stress (MPa) of Common electrode/First Protection Layer during First Heat Treatment | Final stress (MPa) of Common electrode/First Protection Layer during Second Heat Treatment | Difference (MPa) between initial and final stresses of Common electrode/First Protection Layer |
|---|---|---|---|---|---|---|
| 1 | −322.9 | Compressive Stress (−110 MPa) | −193.0 | −184.3 | −106.8 | 86.2 |
| 2 | −311.0 | | −186.5 | −183.0 | −104.3 | 86.2 |
| 3 | −304.5 | Tensile Stress (55 MPa) | −125.8 | −120.3 | −72.5 | 53.3 |
| 4 | −293.4 | | −112.9 | −108.8 | −67.6 | 45.3 |
| 5 | −38.7 | Compressive Stress (−110 MPa) | −52.6 | −51.6 | −5.2 | 47.4 |
| 6 | −26.0 | | −45.3 | −42.4 | 2.9 | 48.2 |
| 7 | 3.1 | Tensile Stress (55 MPa) | 30.5 | 26.6 | 40.0 | 9.5 |
| 8 | −0.6 | | 31.4 | 27.3 | 35.5 | 4.1 |

From Table 1, it can be observed that when the stress of the common electrode CE is about −100 MPa to about +100 MPa, for example, 3.1 MPa, and the stress of the first protection layer 140 is about −100 MPa to about +100 MPa, for example, 55 MPa, the difference between the initial stress and the final stress of the common electrode CE and the first protection layer 140 is between about 1 MPa to about 10 MPa, for example, 9.5 MPa, which is a relatively small stress value. Further, it can be observed that when the stress of the common electrode CE is, for example, −0.6 MPa, and the stress of the first protection layer 140 is, for example, 55 MPa, the difference between the initial stress and the final stress of the common electrode CE and the first protection layer 140 becomes 4.1 MPa, which is a relatively small stress value. Here, if the first protection layer 140 is a tensile stress film that has a stress of about +1 MPa to about +100 MPa, for example, 55 MPa, it can be observed that the difference between the initial stress and the final stress of the common electrode CE and the first protection layer 140 can be minimized such as to have a relatively small value.

The alignment film 150 is disposed along inner surfaces which define the cavity CV to cover the pixel electrode PE. The alignment film 150 may include a liquid crystal alignment material, such as polyamic acid, polysiloxane or polyimide.

The cover layer 160 is disposed on the first protection layer 140. In an exemplary embodiment of fabricating a liquid crystal display, a portion of the cover layer 160, which corresponds to the inlet portion EN through which liquid crystal molecules LC are injected into the cavity CV, is removed such as through a photolithography process to form a through-hole to expose an inner area of the cavity CV. The cover layer 160 may include an organic material.

The second protection layer 170 is disposed on the cover layer 160. In an exemplary embodiment of fabricating a liquid crystal display, a portion of the second protection layer 170, which corresponds to the inlet portion EN for injecting liquid crystal molecules LC into the cavity CV, is removed such as through a photolithography process to form a through-hole to expose an inner area of the cavity CV. The second protection layer 170 may include SiNx.

The sealing film 180 is disposed at the inlet portion EN to seal the inlet portion EN of the cavity CV. The sealing film 180 blocks the inner area of the cavity CV. The sealing film 180 may include a sealing material that does not react on the liquid crystal molecules LC disposed in the cavity CV.

The second capping layer 190 is disposed on the second protection layer 170, and may serve to planarize and protect the second protection layer 170 and other elements positioned on a lower portion of the second protection layer 170. The second capping layer 190 may include an insulating material.

Although not illustrated, the liquid crystal display may further include an encapsulation layer disposed on the second capping layer 190. In a conventional liquid crystal display, a second substrate may be coupled to the substrate including a thin film transistor thereon. In an exemplary embodiment of the liquid crystal display of according to the invention, the encapsulation layer may obviate a second substrate in addition to the substrate 110 upon which the thin film transistor TFT is disposed.

In one or more exemplary embodiment of a liquid crystal display having the above-described structure, the thin film transistor TFT is turned on in response to a driving signal that is provided through the gate line GL. If the thin film transistor TFT is turned on, an image signal, which is provided through the data line DL, is provided to the pixel electrode PE through the thin film transistor TFT. Accordingly, an electric field is formed between the pixel electrode PE and the common electrode CE, liquid crystals of the liquid crystal layer LC are driven, and the resultant image is displayed.

As described above, according to one or more exemplary embodiment of the liquid crystal display according to the invention, the common electrode CE includes a material that includes metal oxide and zinc oxide (ZnO), and a change of the physical property of the common electrode CE due to the subsequent thermal process can be reduced or effectively prevented. Accordingly, the etching of the portion of the common electrode CE that is positioned around the data pad can be performed accurately and completely in the data pad exposing process for connecting the data pad to an external wiring, which is provided in a liquid crystal display fabricating process. Accordingly, in one or more exemplary embodiment of the invention, occurrence of an electrical short between the data pad and the common electrode can be reduced or effectively prevented. In contrast, in a conventional liquid crystal display, a common electrode which is formed of ITO is not etched well, but instead is partially crystallized due to the change of the physical property thereof in a thermal process.

Further, according one or more exemplary embodiment of a liquid crystal display according to the invention, since the common electrode CE has a stress of about −100 MPa to about +100 MPa and the first protection layer 140 has a stress of about −100 MPa to about +100 MPa, the difference between the initial stresses of the common electrode CE and the first protection layer 140 and the final stresses of the common electrode CE and the first protection layer 140 after the subsequent thermal process can be minimized. Accordingly, generation of wrinkles, which may be generated in the common electrode CE due to the subsequent thermal process, can be minimized to reduce or effectively prevent the deformation of the inlet portion EN of the cavity CV, and thus the liquid crystal layer can be formed with a desired size.

Hereinafter, an exemplary embodiment of a method for fabricating a liquid crystal display according to the invention will be described.

FIGS. 4 to 12 are cross-sectional views explaining an exemplary embodiment of a method for fabricating a liquid crystal display according to the invention.

Figure 4:
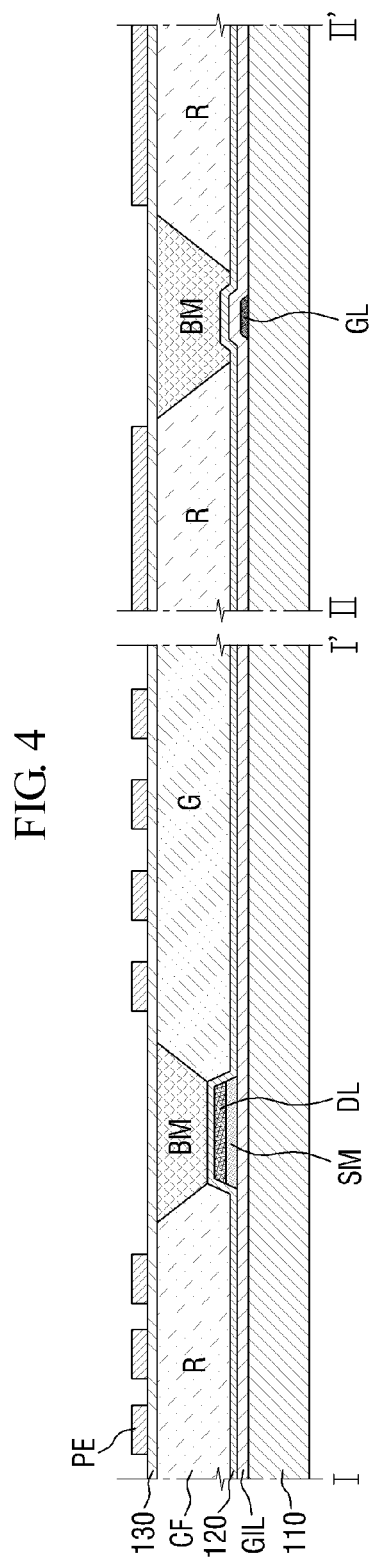
FIGS. 4 to 12 are cross-sectional views of illustrating an exemplary embodiment of a method for fabricating a liquid crystal display according to the invention.

Referring to FIG. 4, a pixel electrode PE is formed on a substrate 110.

Specifically, a first conductive layer is formed on the substrate 110 through a sputtering process or the like, and the formed first conductive layer is patterned such as using a photolithography process to form a gate line (GL in FIG. 1). A gate pad (GP in FIG. 1) and a gate electrode (GE in FIG. 1) are simultaneously formed in the forming the gate line GL.

A gate insulating layer GIL is formed on the substrate 110, including the gate pad GP and the gate electrode GE thereon, such as through a plasma enhanced chemical vapor deposition ("PECVD") process.

A semiconductor material layer and a second conductive layer are sequentially laminated on the gate insulating layer GIL, and the patterning of the semiconductor material layer and the second conductive layer is performed such as using a photolithography process to form a data line DL, a source electrode (SE in FIG. 1) connected to the data line DL, a drain electrode (DE in FIG. 1) that is spaced apart from the source electrode (SE in FIG. 1), and a semiconductor layer SM that is formed on an area corresponding to an area between the source electrode (SE in FIG. 1) and the drain electrode (DE in FIG. 1). A data pad (DP in FIG. 1) is simultaneously formed in forming the data line DL, the source electrode SE connected to the data line DL and the drain electrode DE. Here, the gate electrode (GE in FIG. 1), the semiconductor layer SM, the source electrode (SE in FIG. 1), and the drain electrode (DE in FIG. 1) constitute a thin film transistor (TFT in FIG. 1).

An insulating layer 120 is formed on the gate insulating layer GIL to cover the thin film transistor TFT and the data pad DP. The insulating layer 120 is a protection film, and may be formed of silicon nitride or silicon oxide through the PECVD process or the like.

A color filter CF may be formed at a position corresponding to a pixel area (PA in FIG. 1), on the insulating layer 120. The color filter CF may be one of a red color filter (R), a green color filter (G), and a blue color filter (B). The color filter CF may be formed by patterning an organic polymer material such as through a photolithography process or by printing the organic polymer material such as through an ink jet process.

A black matrix BM may be formed at a position corresponding to the edge of the pixel area (PA in FIG. 1), on the insulating layer 120. The black matrix BM may be formed by patterning a light interception material such as through the photolithography process.

A first capping layer 130 is formed on the color filter CF and the black matrix BM. The first capping layer 130 may be formed of an insulating material such as through a deposition method.

The pixel electrode PE is formed at a position corresponding to the pixel area (PA in FIG. 1), on the first capping layer 130. The pixel electrode PE is connected to the drain electrode (DE in FIG. 1). The pixel electrode PE may be formed by forming a transparent conductive material layer on the first capping layer 130 and then patterning the formed transparent conductive material layer such as by using the photolithography process.

Figure 5:
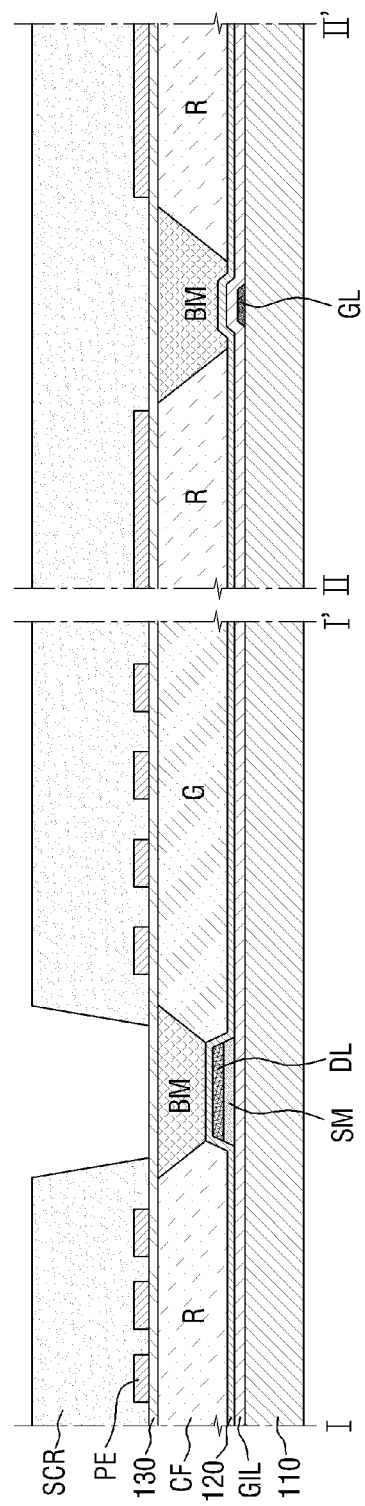

Referring to FIG. 5, a sacrificial layer SCR is formed at a position corresponding to the pixel area (PA in FIG. 1), on the first capping layer 130. The sacrificial layer SCR covers the pixel electrode PE. The sacrificial layer SCR may be formed by patterning a photosensitive material through the photolithography process. An opening may be defined in the sacrificial layer SCR and exposing a portion of the first capping layer 130 overlapping the data line DL.

Figure 6:
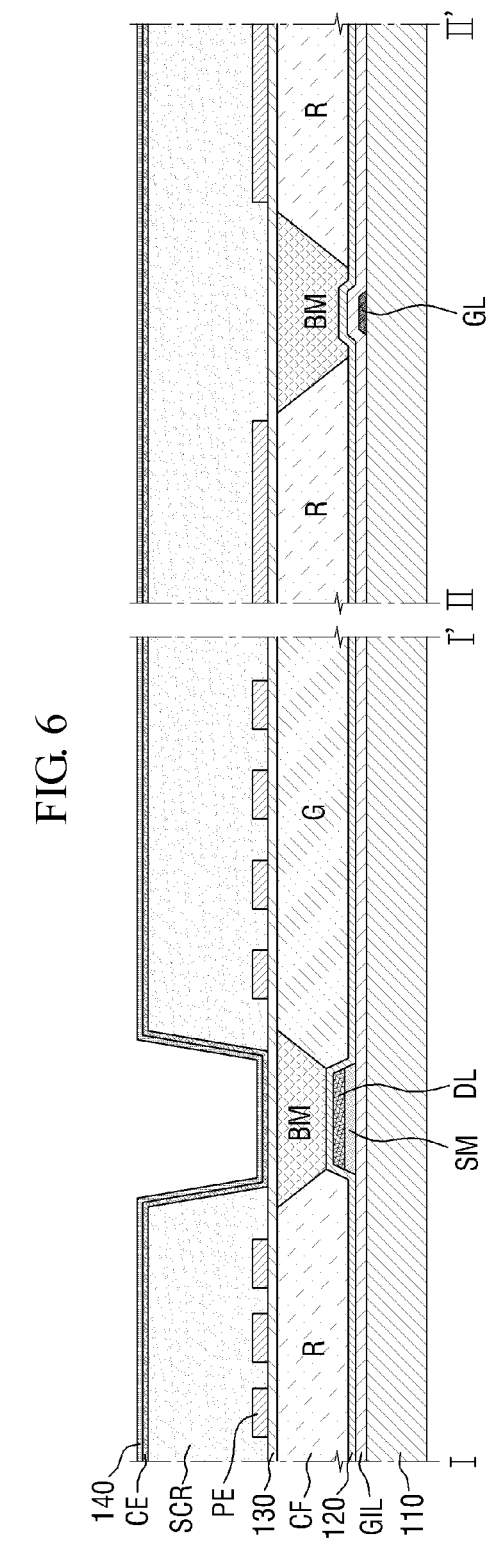

Referring to FIG. 6, a common electrode CE and a first protection layer 140 are formed in order, on the first capping layer 130 on which the sacrificial layer SCR is formed.

Specifically, the common electrode CE may be formed of a material including metal oxide and zinc oxide (ZnO) such as through a deposition process. Further, the common electrode CE may be formed to have a stress of about −100 MPa to about +100 MPa through adjustment of process conditions. Further, the common electrode CE may be formed with a thickness of about 500 Å or more. Since the common electrode CE has previously been described in detail, duplicate description thereof will be omitted.

The first protection layer 140 may be formed of at least one of SiNx, SiOx, and SiOxNy such as through a deposition process. Further, the first protection layer 140 may be formed with a thickness of about 1000 Å or more. Further, the first protection layer 140 may be formed to have a stress of about −100 MPa to about +100 MPa, and more preferably, may be formed of a tensile stress film having a stress of about +1 MPa to about +100 MPa. Since the first protection layer 140 has been previously described in detail, duplicate description thereof will be omitted.

Figure 7:
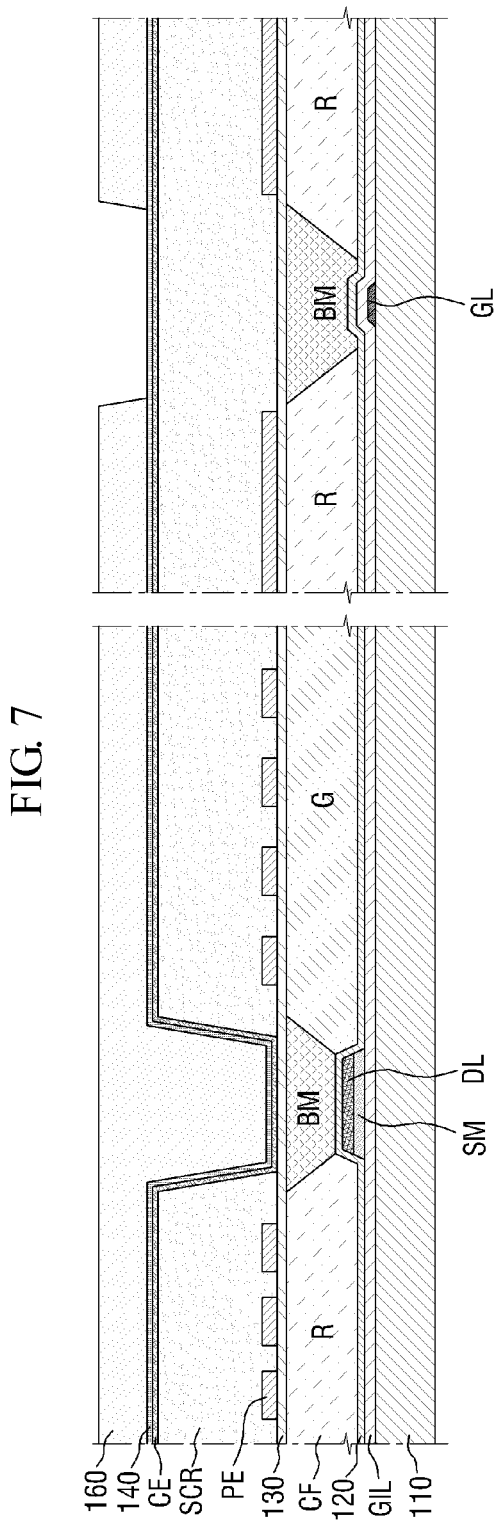

Referring to FIG. 7, a cover layer 160 is formed on the first protection layer 140. The cover layer 160 may be formed of an organic material, and may be formed using the photolithography process so that a through-hole is formed in the cover layer 160 at an area corresponding to an inlet portion (EN in FIG. 3) of a cavity (CV in FIG. 3) that is formed by removing the sacrificial layer SCR thereafter.

Figure 8:
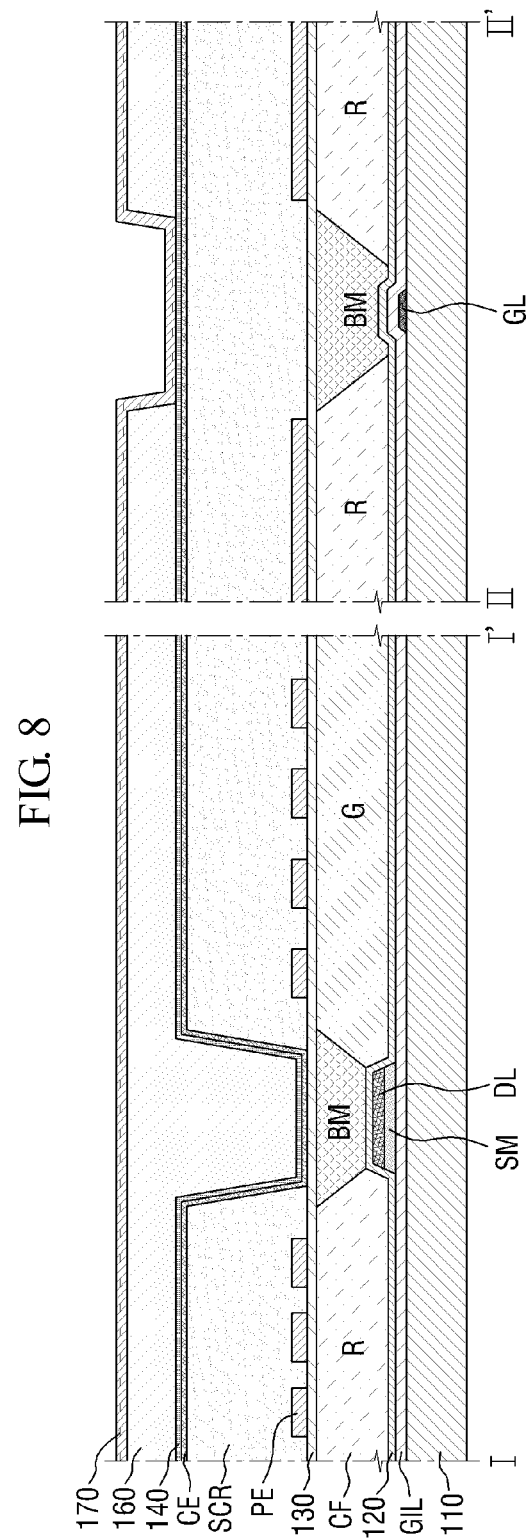

Referring to FIG. 8, a second protection layer 170 is formed on the cover layer 160 and in the through-hole. The second protection layer 170 may be formed of SiNx such as through a deposition process.

Figure 9:
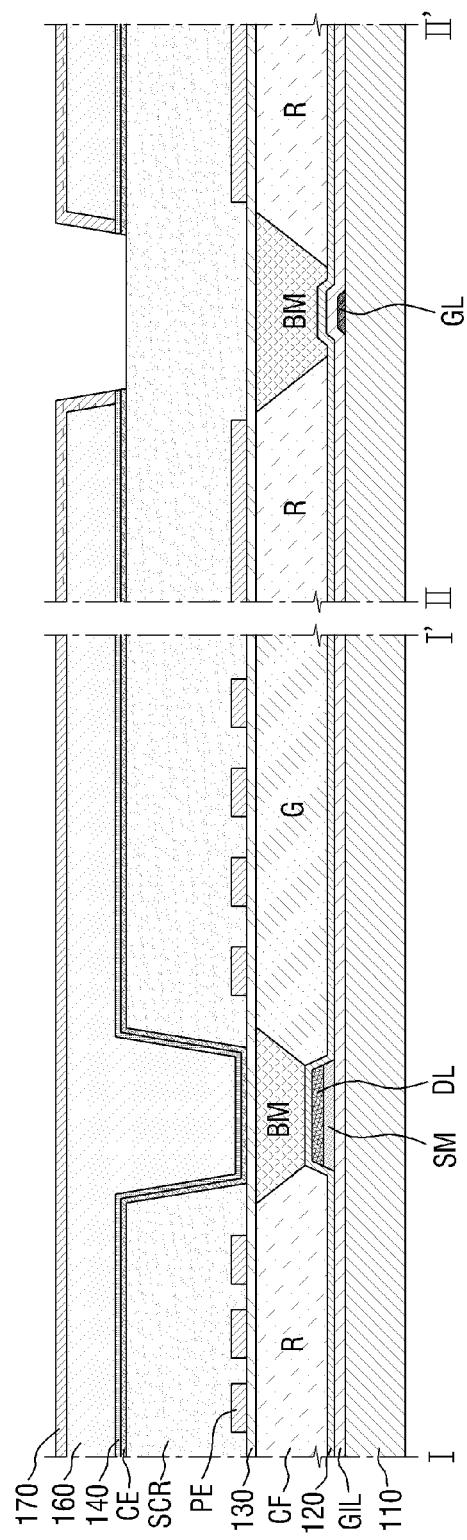

Referring to FIG. 9, at an area corresponding to the inlet portion (EN in FIG. 3) of the cavity (CV in FIG. 3), portions of the second protection layer 170, the first protection layer 140 and the common electrode CE are removed through the photolithography process. The sacrificial layer SCR is exposed in the removing portions of the second protection layer 170, the first protection layer 140 and the common electrode CE.

Figure 10:
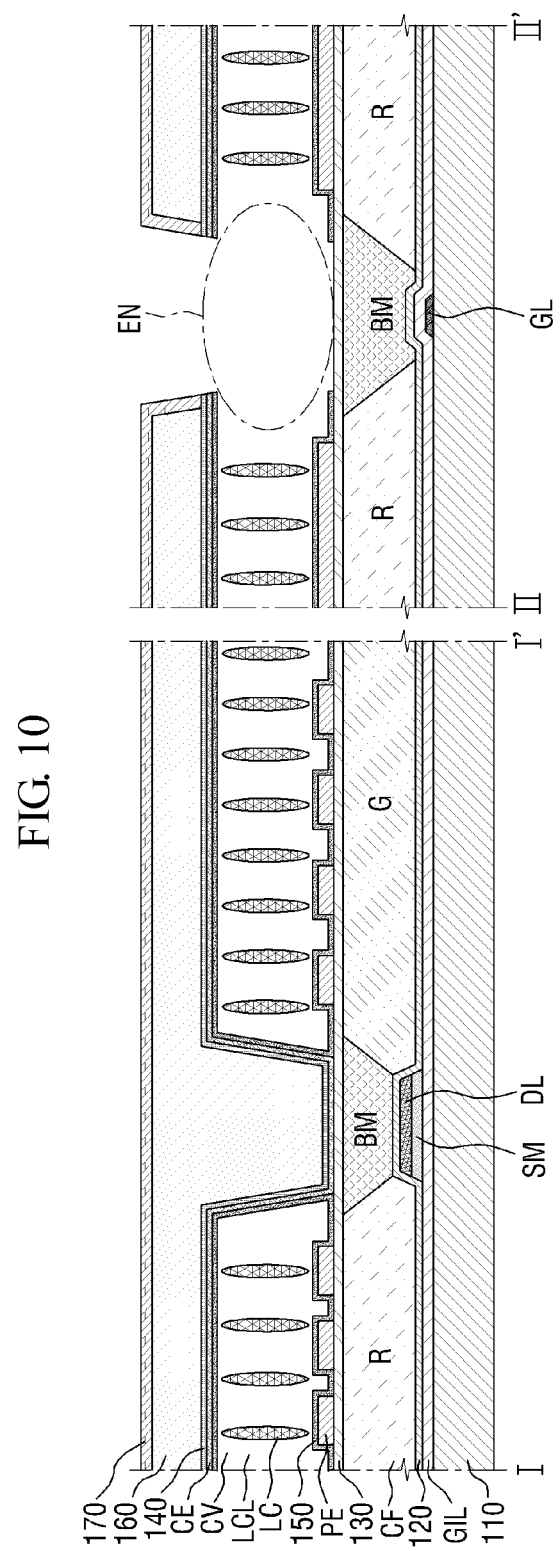

Referring to FIG. 10, the sacrificial layer SCR is removed. Accordingly, the cavity CV that is a defined space into which liquid crystal molecules LC are injected is formed, and the inlet portion EN of the cavity CV, that is a path through which the liquid crystal molecules LC are injected, is formed. The removal of the sacrificial layer SCR may be performed through an etching process and/or a strip process.

An alignment film 150 is formed along the inner wall of the cavity CV. The alignment film 150 may cover the pixel electrode PE. A liquid crystal layer LCL is formed on the alignment layer 150, such as by injecting the liquid crystal molecules LC into the cavity CV. In an alternative exemplary embodiment, the alignment film 150 may be omitted.

Figure 11:
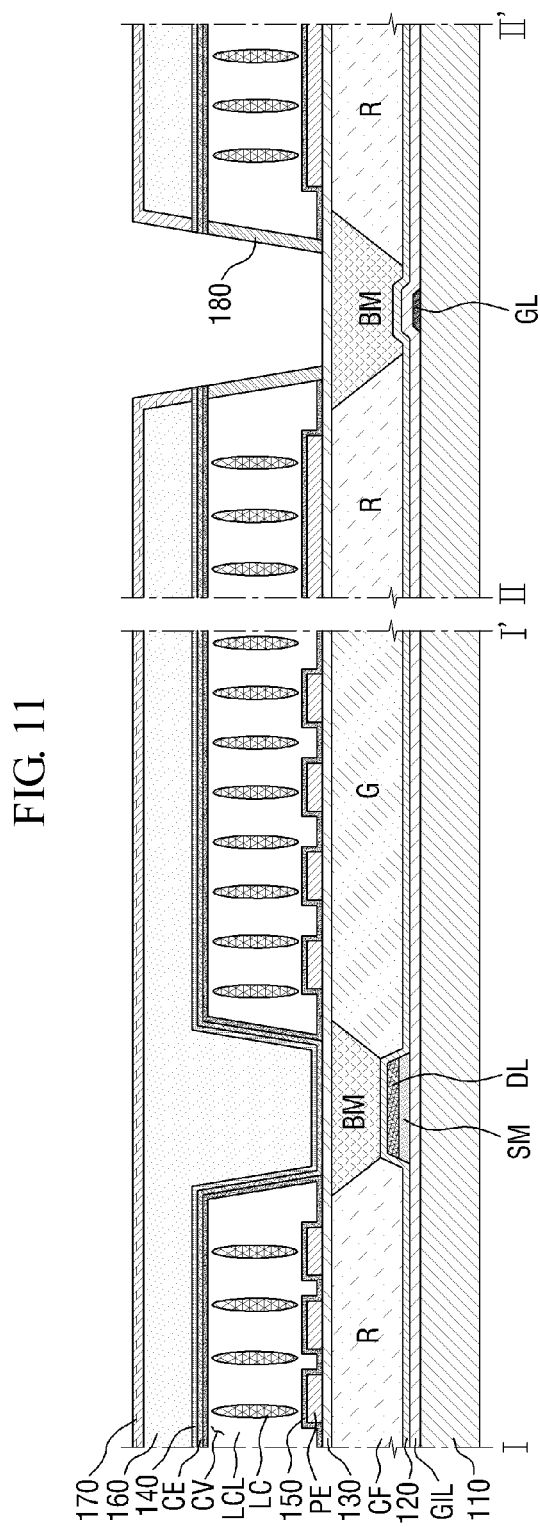

Referring to FIG. 11, a sealing film 180 is formed to seal the inlet portion EN of the cavity CV, and block access to the inner area of the cavity CV. The sealing film 180 may be formed of a sealing material that does not react on the liquid crystal molecules LC which have been injected into the cavity CV.

Figure 12:
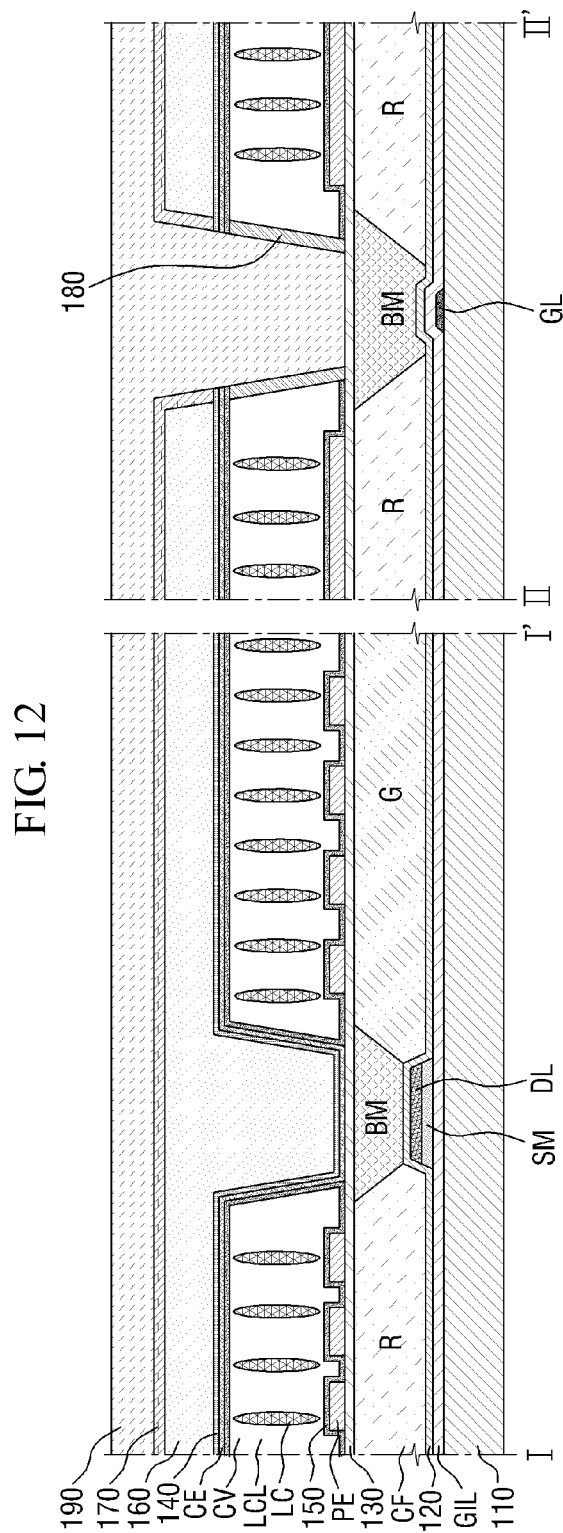

Referring to FIG. 12, a second capping layer 190 is formed on the second protection layer 170. The second capping layer 190 may be formed of a sealing material.

Although not illustrated, the method for fabricating a liquid crystal display may further include forming an encapsulation layer on the second capping layer 190. The encapsulation layer may obviate another substrate in addition to the substrate 110, different from a conventional liquid crystal display in which another substrate is coupled to the substrate on which the thin film transistor is formed.

In concluding the detailed description, those skilled in the art will appreciate that many variations and modifications can be made to the exemplary embodiments without substantially departing from the principles of the invention. Therefore, the disclosed exemplary embodiments of the invention are used in a generic and descriptive sense only and not for purposes of limitation.

What is claimed is:

1. A liquid crystal display comprising:
a substrate;
a first electrode on the substrate;
a second electrode comprising metal oxide and zinc oxide, on the first electrode and spaced apart from the first electrode;
a cavity provided in plural defined between the first electrode and the second electrode;
an inlet portion which is defined between adjacent cavities and exposes inner areas thereof;
a first protection layer which is directly on the second electrode and disposes the second electrode between the substrate and the first protection layer;
a cover layer which is on the first protection layer and disposes the first protection layer between the second electrode and the cover layer; and
a liquid crystal layer comprising liquid crystal molecules, in the cavity,
wherein with the first protection layer directly on the second electrode comprising the metal oxide and the zinc oxide, and each of the second electrode, the first protection layer and the cover layer terminate at the inlet portion to expose the inlet portion.

2. The liquid crystal display of claim 1, wherein the metal oxide is about 10 weight percent to about 90 weight percent with respect to a total content of the metal oxide and zinc oxide.

3. The liquid crystal display of claim 1, wherein the metal oxide comprises at least one selected from $In_2O_3$, $Ga_2O_3$, $Cr_2O_3$, $MnO$, $Ta_2O_5$, $SiO_2$, $TiO_2$, $ZrO_2$, $BaO$, $Li_2O$, $La_2O_3$, $Nd_2O_3$, $BeO$, $ThO_2$, $Y_2O_3$, $CaO$, $Sc_2O_3$, $MgO$, $Sm_2O_3$, $Al_2O_3$, $UO_2$, $CaO$, $B_2O_3$, $Na_2O$ and $Nb_2O_5$.

4. The liquid crystal display of claim 1, wherein the second electrode has a stress of about −100 megapascals to about +100 megapascals.

5. The liquid crystal display of claim 1, wherein the second electrode has a thickness of about 500 angstroms or more.

6. The liquid crystal display of claim 1, wherein the first protection layer comprises at least one of SiNx, SiOx and SiOxNy.

7. The liquid crystal display of claim 1, wherein the first protection layer has a stress of about −100 megapascals to about +100 megapascals.

8. The liquid crystal display of claim 1, wherein the first protection layer comprises a tensile stress film having a stress of about +1 megapascal to about +100 megapascals.

9. The liquid crystal display of claim 1, further comprising a second protection layer on the cover layer.

10. The liquid crystal display of claim 9, wherein a difference between an initial stress and a final stress of the second electrode and the first protection layer is about 1 megapascal to about 10 megapascals, and
wherein
the initial stress is defined as a stress of the second electrode and the first protection layer, without the cover layer and the second protection layer on the second electrode and the first protection layer, and
the final stress is defined as a stress of the second electrode and the first protection layer, with the cover layer and the second protection layer on the second electrode and the first protection layer.

11. The liquid crystal display of claim 1, wherein the first protection layer has a thickness of about 1000 angstroms or more.

12. A method for fabricating a liquid crystal display, comprising:
forming a first electrode on a substrate;
forming a sacrificial layer on the first electrode;
forming a second electrode of metal oxide and zinc oxide on the sacrificial layer
forming a first protection layer directly on the second electrode formed of metal oxide and zinc oxide, the forming the first protection layer disposing the second electrode between the substrate and the first protection layer;
forming a cover layer on the first protection layer, the forming the cover layer disposing the first protection layer between the second electrode and the cover layer;
after forming the cover layer, removing the sacrificial layer to form a cavity provided in plural defined between the first electrode and the second electrode and to form an inlet portion which is defined between adjacent cavities and exposes inner areas thereof; and
forming a liquid crystal layer, by injecting liquid crystal molecules into the cavity,
wherein each of the second electrode formed of the metal oxide and the zinc oxide and the first protection layer terminate at the inlet portion.

13. The method of claim 12, wherein the first protection layer is formed of at least one of SiNx, SiOx and SiOxNy.

14. The method of claim 12, wherein the second electrode is formed to have a stress of about −100 megapascals to about +100 megapascals.

15. The method of claim 12, wherein the first protection layer is formed to have a stress of about −100 megapascals to about +100 megapascals.

16. The method of claim 12, wherein the first protection layer is formed as a tensile stress film having a stress of about +1 megapascal to about +100 megapascals.

17. The method of claim 12, further comprising forming a second protection layer on the cover layer, after forming the cover layer on the first protection layer and the second electrode.

18. The method of claim 17, wherein a difference between an initial stress and a final stress of the second electrode and the first protection layer is about 1 megapascal to about 10 megapascals, and
wherein
the initial stress is a stress of the second electrode and the first protection layer after the first protection layer is formed, and
the final stress is a stress of the second electrode and the first protection layer after the cover layer and the second protection layer are formed.

19. The method of claim 12, further comprising forming an alignment film along an inner wall of the cavity and covering the first electrode, before the forming the liquid crystal layer.

20. The method of claim 12, wherein the forming a liquid crystal layer comprises injecting the liquid crystal molecules into the cavity through an inlet portion of the cavity, and
further comprising forming a sealing film at the inlet portion of the cavity to seal the inlet portion of the cavity, after the injecting the liquid crystal molecules into the cavity is completed.

21. A liquid crystal display comprising:
a substrate;
a first electrode on the substrate;
a second electrode comprising metal oxide and zinc oxide, on the first electrode and spaced apart from the first electrode;
a cavity provided in plural defined between the first electrode and the second electrode;
an inlet portion which is defined between adjacent cavities and exposes inner areas thereof;
a first protection layer on the second electrode;
a cover layer on the first protection layer; and
a liquid crystal layer comprising liquid crystal molecules, in the cavity,
wherein each of the second electrode comprising the metal oxide and the zinc oxide and the first protection layer terminate at the inlet portion,
wherein the second electrode has a stress of about −100 megapascals to about +100 megapascals, and
wherein the first protection layer has a stress of about −100 megapascals to about +100 megapascals.

* * * * *